(No Model.) 5 Sheets—Sheet 1.

E. J. SHIRLEY.
BALING PRESS.

No. 593,383. Patented Nov. 9, 1897.

Witnesses:
F. T. Johnson
Alfred D. Townsend

Inventor:
Elmer J. Shirley
by Hazard & Townsend
his Attys (No Model.) 5 Sheets—Sheet 2.
E. J. SHIRLEY.
BALING PRESS.

No. 593,383. Patented Nov. 9, 1897.

Witnesses:
F. T. Johnson
Alfred L. Townsend

Inventor:
Elmer J. Shirley
by Hazard & Townsend
his attys (No Model.) 5 Sheets—Sheet 3.

E. J. SHIRLEY.
BALING PRESS.

No. 593,383. Patented Nov. 9, 1897.

Witnesses:
F. T. Johnson
Alfred J. Townsend

Inventor:
Elmer J. Shirley
by Hazard Townsend
his attys (No Model.) 5 Sheets—Sheet 5.

E. J. SHIRLEY.
BALING PRESS.

No. 593,383. Patented Nov. 9, 1897.

Witnesses:
F. T. Johnson
Alfred J. Townsend

Inventor:
Elmer J. Shirley
by Hazard Townsend
his Atty

UNITED STATES PATENT OFFICE.

ELMER J. SHIRLEY, OF EL MODENA, CALIFORNIA.

BALING-PRESS.

SPECIFICATION forming part of Letters Patent No. 593,383, dated November 9, 1897.

Application filed December 16, 1896. Serial No. 615,944. (No model.)

*To all whom it may concern:*

Be it known that I, ELMER J. SHIRLEY, a citizen of the United States, residing at El Modena, in the county of Orange and State of California, have invented a new and useful Baling-Press, of which the following is a specification.

In my present invention I employ a rotating cylinder with endless worm which reciprocates a traveler lengthwise the cylinder. This cylinder, with switches and traveler, is shown and claimed in former Letters Patent No. 558,216, granted to myself and Charles W. Merrill, dated April 14, 1896. In said former patent two endless-worm cylinders with two travelers are used, and these are arranged on opposite sides of the baling-chamber. One object of my present invention is to simplify the machine and to increase the efficiency and decrease the size, weight, and cost. By this invention I am enabled to dispense with one of the endless-worm cylinders.

My invention comprises the combination of a rotating endless-worm cylinder, a plunger having a path toward and from the cylinder parallel with or in line with the extended axis thereof, a traveler operated by the worm, a plunger-beam or connecting-beam carrying and connecting the plunger and the traveler, and guides for the plunger and traveler. The endless-worm cylinder is rotated by suitable mechanism to move the traveler from end to end of the worm, thereby to move the connecting-beam and the plunger toward and from the end of the cylinder. The cylinder is mounted on the frame of the press at one end thereof and does not add to the width of the press. This makes the present machine less cumbersome to handle than the former machine. The press is preferably a double-ended press, so that two bales are formed at a time.

My invention includes mechanism for automatically tying the bale with wire. It also includes various parts, combinations, and features hereinafter particularly described and claimed.

The accompanying drawings illustrate my invention.

Fig. 6 is a cross-sectional elevation of the machine on line indicated by 6 6, Figs. 2 and 4, looking in the direction of the arrows. The plunger is shown in the same position as in Fig. 4. Fig. 7 is a like section on line 7 7 in the same figures. The plunger is in the position indicated by dotted lines in Fig. 4. Fig. 8 is a detail of the ratchet which works the tying mechanism. Figs. 10 to 20 are details showing different positions of the knotter, viz.

12. Fig. 16 is a fragmental plan of the knotter and twister in the fourth position with the twister retracted ready to twist the wires which it had drawn into a loop. Fig. 17 is a fragmental plan of the knotter and twister in the fifth position after the wires have been twisted into the knot. Fig. 18 is a fragmental plan of the knotter and twister in the sixth position with knot tied and twister ready to receive the wire when the needle retracts. Fig. 19 is a fragmental elevation with parts in position to receive the needle on its return stroke. This view is taken looking at right angles to the path of the needle. Fig. 20 is a fragmental elevation showing parts in the position shown in Fig. 16. Dotted lines indicate the position of the clamp when tilted. Fig. 21 is a fragmental side elevation of the needle with the wire in place.

A indicates the press-frame, having a feeding-chamber $a$ and baling-chambers $a^3 a^{3'}$ arranged lengthwise thereof.

Figure 1:
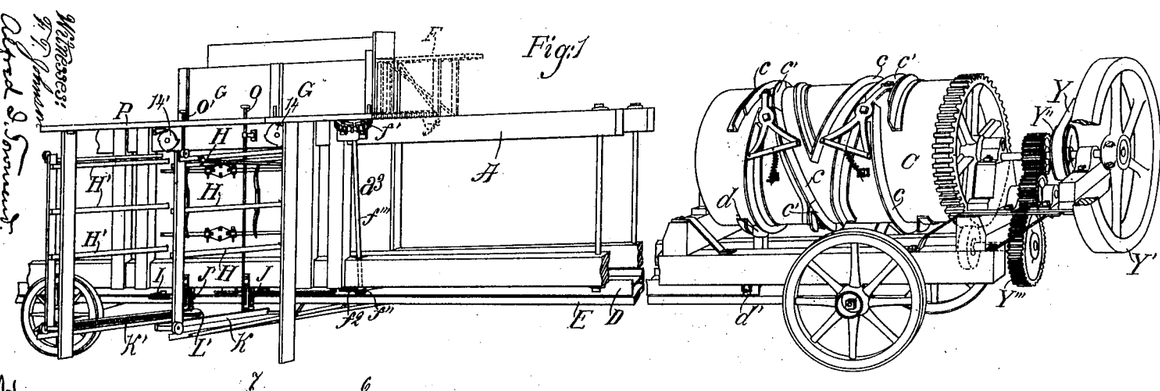
Figure 1 is a fragmental perspective view of a hay-baler embodying this invention.
Figure 2:
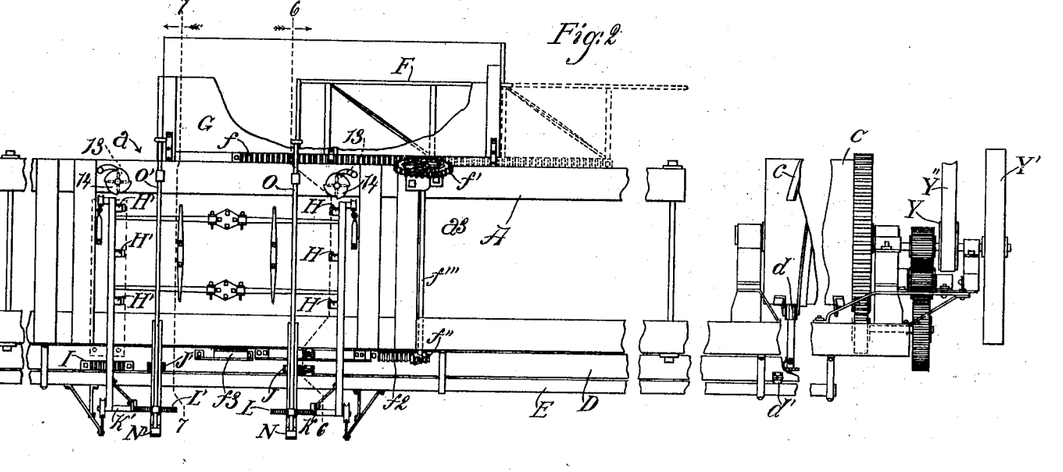
Fig. 2 is a fragmental side elevation of the same. A portion of the feed-box is broken away to show the condenser in its condensing position. The loading-platform is omitted.

C indicates the endless-worm cylinder, the endless worm of which is composed of the guides $c$ and switches $c'$, which are fully described in said former patent and are shown in Figs. 1 and 2 of the drawings herein.

D indicates the plunger-carrying beam, on which is mounted the traveler $d$, which is driven by the endless worm. The endless-worm cylinder is mounted lengthwise the press-frame, and the plunger B has its path toward and from the cylinder parallel with and in line with the extended axis of the cylinder, and the connecting beam D connects the plunger and the traveler $d$, which is driven by the worm, so that when the cylinder rotates the plunger moves back and forth in the chamber.

E indicates a suitable track for the plunger-beam. The plunger-beam D is provided with the plunger-thrust support and guide-rollers $d'$, $d''$, and $d'''$ to receive and support the thrust or strain exerted on the beam by the resistance of the plunger, thereby to allow the plunger and the traveler to move with a minimum friction.

F indicates a condenser for compressing hay in the feed-box G, which is arranged above the feed and baling chambers $a\ a^3$.

Figure 3:
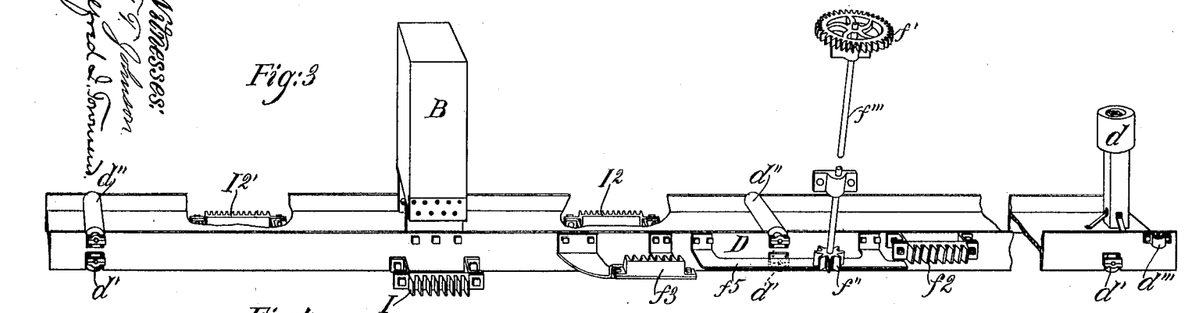
Fig. 3 is a fragmental perspective view of the plunger, the traveler, the beam which connects the two, and the pinion, shaft, and cogwheel which operate the condenser which condenses the hay in the feed-box. The beam is broken to contract the view and also to show the two twister and knotter operating racks.

$f$ is a rack connected with the condenser F to drive the same. $f'$ is a cog-wheel to drive said rack, and $f''$ is a pinion connected with the cog-wheel $f'$ by suitable means, such as the shaft $f'''$. Two racks $f^2$ and $f^3$, facing in opposite directions, are connected (through beam D) with the plunger B to move therewith and are respectively arranged to engage the pinion $f''$ at the opposite extremes of the strokes of the plunger—that is to say, the rack $f^2$ is fastened to the plunger-beam D at such a point that at the close of the stroke of the plunger B to the left in Figs. 1, 2, and 3 the rack $f^2$ will rotate the pinion $f''$ to throw the condenser F into the feed-box to compress any hay that may be therein, and when the plunger begins to return the movement thereof will cause the rack to rotate the pinion $f''$ in the opposite direction, thus to immediately withdraw the condenser from the feed-box. The rack $f^3$ is fastened to the beam D at such a point that at the close of the stroke when the plunger B is at the other end of the baling-chamber—that is, to the right in Figs. 1, 2, and 3—the rack $f^3$ will rotate the pinion $f''$ to again throw the condenser into the feed-box to compress the hay therein, and immediately upon the return movement of the plunger the pinion $f''$ will be rotated in the opposite direction to again draw the condenser out of the feed-box. The racks $f^2$ and $f^3$ are each about six inches long and the space between these racks is about two feet and the stroke of the plunger about three feet, so that the compressor is stationary during a large portion of the movement of the plunger. The cog-wheel $f'$ is of such size relative to the pinion $f''$ as to give the compressor the desired length of stroke during the time the plunger moves the length of the short rack $f^2$ or $f^3$.

My invention also comprises the combination of a baling-press frame, a plunger working in the chamber thereof, a needle H, mounted at one side of the chamber and arranged to play across the chamber, a rack I, connected with the plunger to move therewith, a cog-wheel J, arranged to be rotated by such rack, a rack K, connected with said needle to operate the same, a cog-wheel L to operate the rack, and means to connect the two cog-wheels with each other. The means which I have shown for connecting the two cog-wheels with each other comprises the clutch $m\ m'$ and suitable means for throwing said clutch into operation, so that the rotation of the wheel J will produce the rotation of the wheel L and the movement of the rack K.

Various means may be provided for operatively connecting the plunger-carrying beam D with the needles H. N indicates a lever to move the wheel L vertically, the rack K being of sufficient width to allow this to be done while the wheel L remains in mesh with the rack. O indicates a rod extending from the loading-platform P down to the lever N and adapted to operate said lever and consequently raise the wheel L when rod O is depressed. When the wheel L is raised, the clutch $m\ m'$ is connected, and when rack I engages the cog-wheel J the cog-wheel L is rotated to drive the needle-rack K. Thus the movement imparted by the rack I will throw the needles across the chamber of the press.

By preference three needles are provided at each end of the feed-chamber $a$, so that the wires for tying the two bales can be carried across at the points desired. The corresponding parts at the opposite ends of the chamber are designated by corresponding letters, an indice being added to the letters at one end of the feed-chamber to distinguish them from those at the other end.

My invention also comprises the combination of the baling-press frame, mechanism on one side of the chamber thereof for gripping and knotting a baling-wire, means operatively connected with the plunger of the baling-press for operating said mechanism, needles for baling-wire mounted at the opposite ends of the chamber of the press and having their paths across the chamber, and means for moving the needles across the chamber and the knotting mechanism. In the double-ended baler two sets of needles H and H' are arranged at opposite ends of the chamber, respectively, and have their paths across the chamber, and two cog-wheels L and L' are respectively connected with the mechanism for operating said needles, respectively, and the rack I, which is connected with the plunger B, is arranged to operate said cog-wheels, respectively, at the opposite ends of each stroke of the plunger. The pinions J and J' are respectively located at such distances from the opposite ends of the path of the needle-rack I that they will not be driven by the rack at the close or beginning of the strokes of the plunger, but will throw the needle across the bale-box after the plunger is out of the path of the needle and then on the return stroke will withdraw the needle from the path of the plunger.

The knotter device for each needle comprises the combination of a rotary twister-hook Q, mounted to rotate and to move axially—that is to say, along the axis of its rotation—a clamp R arranged at one side of the path of the twister-hook for holding one end of a wire, a wire-support S on the opposite side of the path of the twister-hook, means for moving the twister-hook axially to draw the wire against the wire-clamp and the wire-support and to draw the wire into a loop out of line between the wire-clamp and wire-support, and means for rotating the hook. Preferably the needle serves as an actuating means for moving the twister-hook axially, so that when the needle makes its thrust past the twister-hook and carries a baling-wire over the hook Q and to the clamp R the needle will then cause the twister-hook Q to slide away from the needle to draw the wire into a loop, as indicated in Fig. 16, so that when the hook is thereafter caused to rotate it will twist the wire, as indicated in Figs. 17 and 18. The means for rotating the twister-hook comprises suitable mechanism which transmits power from the plunger-beam. A clutch $q$ is connected through suitable intermediate mechanism with the plunger and drives the twister-hook, so that when the plunger is at a given point of its stroke the twister-hook will be rotated.

The twister-hook is journaled and is normally free to turn, and the head thereof normally stands on one side of a right line drawn between the wire-clamp and the wire-support, and the needle is arranged to carry the wire past the support and into the clamp. The clamp R is pivoted to tilt and is arranged in the path of the under part of the point of the needle, so that when the needle has carried the wire beyond the wire-support S the needle will engage the clamp and tilt it. The point of the needle is beveled, so that the clamp will be gradually tilted thereby, and $h$ indicates a recess in the under side of the needle, back of the point of the needle, to allow the clamp to return to an upright position after the wire T has been brought into position to be received between the jaws of the clamp. Suitable means, such as the spring U, is provided to raise the clamp R into position to receive the wire after the needle has carried the wire over the clamp. The tilting wire-clamp is pivotally mounted on a slide R', which slides in a suitable frame V. A spring R'' is arranged to hold the slide toward the path of the needle, thus to hold the clamp normally in the path of the needle-point. The needle-point is provided with a shoulder $h'$, which at the forward movement of the needle will pass over the tilting clamp R without sliding said clamp out of the path of the needle. The rear face of this shoulder is beveled, so that when the needle returns the beveled portion of the shoulder $h'$ will cause the clamp to slide sidewise out of the path of the needle. The recess $h$ in the needle allows the clamp R and also the point of the twister-hook Q to rise after the needle has carried the wire forward beyond the twister and clamp. The clamp R comprises a main body portion 1, which is pivoted by a pivot 2 to a suitable base-slide R'. This body portion, which is pivoted to tilt, is provided with a wire-holding post 3 and wire-snip jaw 4, with a space between them. A clamping and snipping jaw 5 is pivoted to the clamp body 1 and arranged to move toward and from the space between the post and the snip-jaw and is provided with a cutting edge 5' to snip the wire and with a clamp-face 5'' to clamp a wire on the wire-holding post 3. Suitable means are provided for operating the snip and clamp jaw 5 to bring it into and out of the space between post 3 and snip-jaw 4. These means preferably comprise a lever 6, fastened to the snip and clamp jaw 5 and projecting into an oblique guideway $r'$ in the slide or base R', to which the body 1 of the clamp is pivoted. The guideway $r'$ is oblique to the axis of the pivot 2, and the arm 6 extends down into this oblique guideway, so that when the clamp is tilted forward by the needle into the position indicated in dotted lines in Fig. 20 the guideway will throw the lower end of the arm 6 toward the needle, thus throwing the clamp and snip jaw 5 away from the post 3 and snip 4, thereby leaving the clamp R open to receive the wire.

Figures 9, 10, 11, 12, 13, 14, 15:
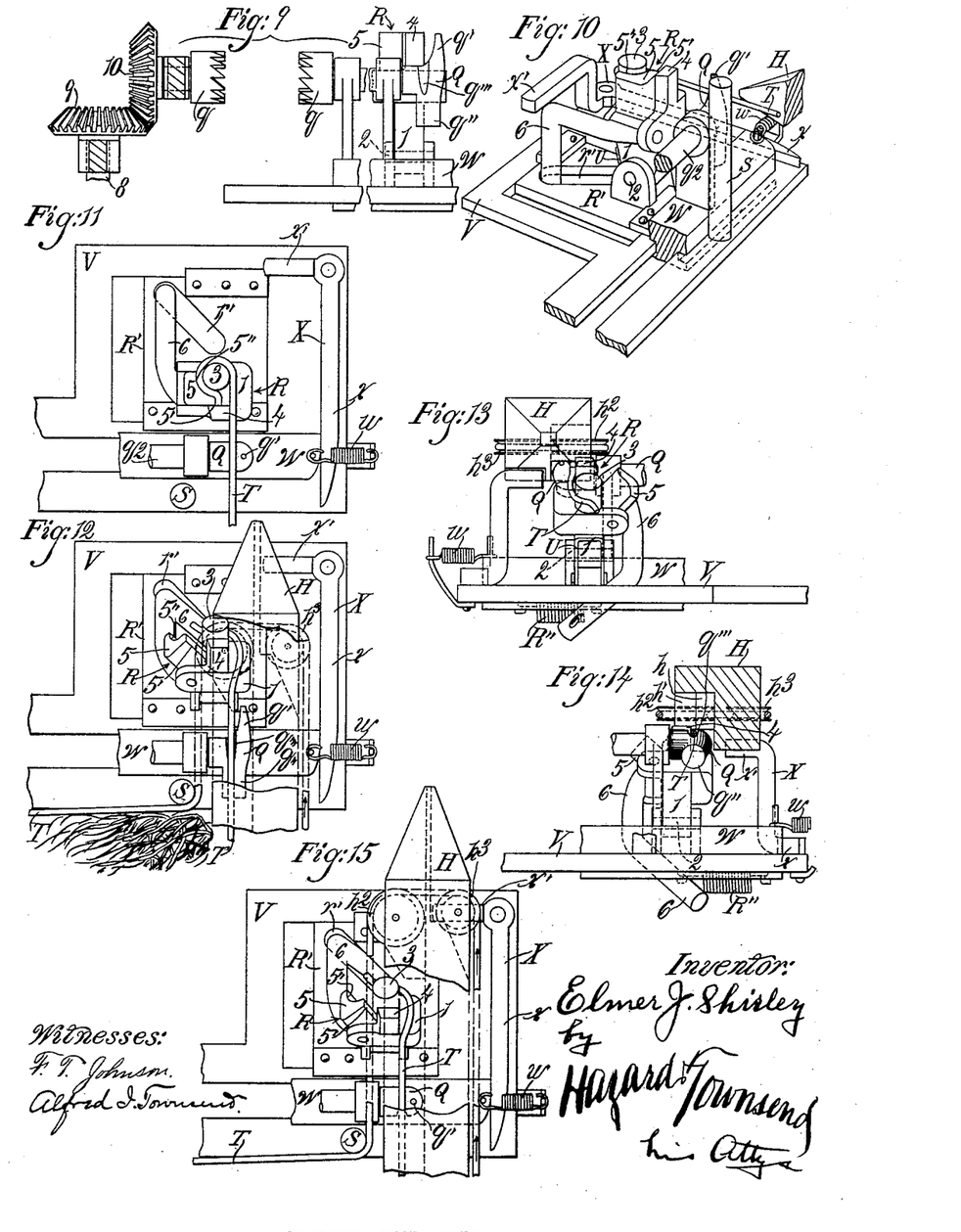
Fig. 9 is a fragmental elevation illustrating the twister.
Fig. 10 is a fragmental perspective view showing the knotter in the first position with a fragment of a wire which is held ready for a bale. A fragment of the needle is shown in the act of retracting from the clamp.
Fig. 11 is a fragmental plan of the knotter when the parts are in the position shown in Fig. 10, the needle being withdrawn and the baling-wire in position to receive the bale.
Fig. 12 is a fragmental plan of the knotter with the parts in the position they occupy when, after the bale has been formed and is ready to be tied, the needle is going over the twister and tilting wire-clamp. In this figure and in Figs. 15, 16, 17, and 18 a fragment of the needle is broken away to expose parts which would otherwise be hidden. The said views show the wire in the position for tying the bale.
Fig. 13 is a fragmental elevation showing the knotter, with the parts in the position shown in Fig. 12. This view is taken looking toward the end of the needle from that side of the mechanism which is at the top of the view in Fig.
Fig. 14 is an elevation with the parts in the position shown in Fig. 13, but the sight is in the opposite direction, the needle being shown in cross-section.
Fig. 15 is a fragmental plan of the knotter in the third position, in which the wire-carrying portion of the needle has passed the twister and clamp and the twister and clamp have returned to their upright positions.

In practical operation as soon as the shoulder $h'$ has passed beyond the clamp R the spring U will return the clamp practically into the position indicated in solid lines in Fig. 20, and then on the return of the needle the shoulder $h'$ will engage the clamp and draw it forcibly back, thus bringing the arm 6 into the position in Figs. 10 and 11, thereby snipping the wire and bending it onto and clamping it against the post 3.

The twister-hook Q is arranged to normally project across a right line drawn between the support S and the tilting clamp R and is journaled on a slide W to move axially across said line. The twister-hook has a point $q'$ and is counterbalanced by a counterbalance $q''$ to hold the point $q'$ normally uppermost.

X indicates a lever having one arm $x$ arranged to move the slide W and the other arm $x'$ arranged in the path of the needle.

$w$ indicates a spiral spring serving as means for returning the slide to its normal position.

The twister-hook and needle are required to operate in conjunction with each other, and they are both actuated by means connected with the plunger. The rack I transmits motion from the plunger-beam to the needle through suitable mechanism, and racks $I^2$ and $I^{2'}$ are provided on the opposite side of the plunger-beam to operate the twister-hooks.

7 indicates a cog-wheel to mesh with the twister-operating rack $I^2$. 8 indicates a shaft operated by said cog-wheel 7 and transmitting motion through a cog-wheel 9 to a cog-wheel 10, which drives the clutch $q$, said clutch being arranged for operatively connecting the twister-hook with the rack $I^2$ through the said intermediate means 7, 8, 9, and 10.

11 indicates a ratchet of any desirable form for connecting the shaft 8 with the cog-wheel 7, allowing rotation of the cog-wheel in one direction to rotate the shaft and leaving the shaft stationary when the cog-wheel 7 rotates in the opposite direction.

Figures 4, 5:
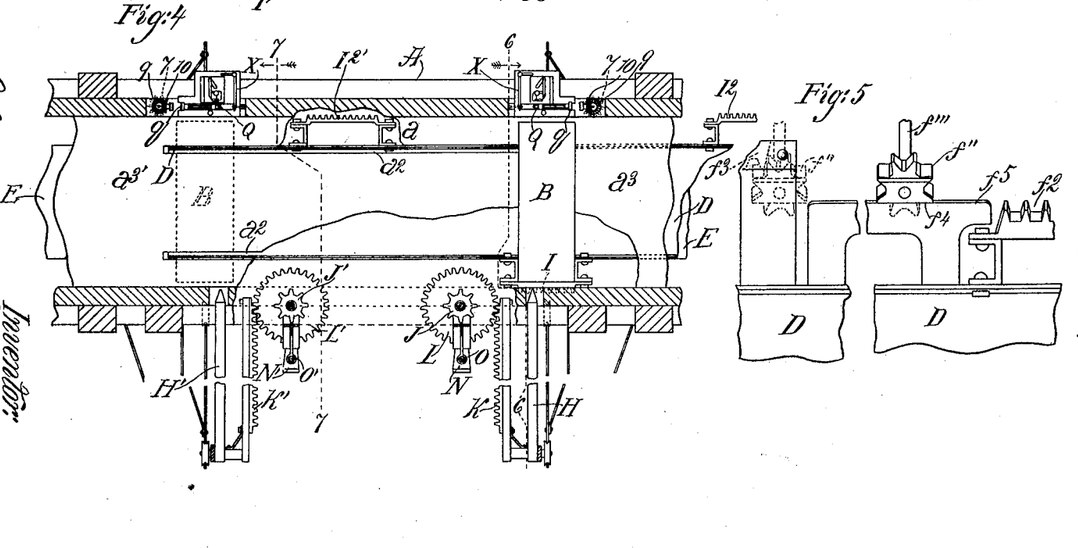
Fig. 4 is a fragmental sectional plan on line 4 4, Figs. 6 and 7. Portions of the wall and floor of the baling-chamber are broken away.
Fig. 5 is a perspective view of the bottom of the condenser-pinion and parts which it engages. Dotted lines indicate the pinion passing from rack to guide, or vice versa.

It is important that the pinion $f'''$ shall always engage properly with the racks $f^2$ and $f^3$ when they reach it, and for this purpose the pinion $f'''$ is provided with a flat face $f^4$ (see Fig. 5) at one end to be engaged by a guide $f^5$, which is fastened to the plunger-beam for the purpose of holding the pinion stationary while the beam is traveling with the pinion between the racks $f^2$ and $f^3$.

13 indicates a folder having four wings or leaves $z$ and provided with a ratchet 14, which prevents it from turning in one direction, but allows it to turn in the other direction. Two folders are provided for the machine, one at each end of the feed-chamber $a$, so that the top ends of the hay which is pushed out of such feed-chamber and into the baling-chamber by the baling-plunger will rotate the folder and pass the folder, but cannot return. This contrivance tucks the hay down at the upper side of the bale and prevents clogging and produces a smooth bale without projecting ends.

The plunger extends close to the bottom and sides of the chamber, say within about one-half an inch, and is connected with the plunger-beam or connecting-beam D by standards $d^2$, which pass through slots $a^2$ in the floor of the baling-chamber. The top of the plunger may be two or three inches below the blades of the folder. The axis of the folder is practically flush with the inner face of the top of the baling-chamber.

The endless-worm cylinder is driven by any suitable power.

Y indicates a belt led from any suitable source of power—such as a horse-power machine, for example—and Y' indicates a fly-wheel for steadying the motion.

Y''' indicates a train of gearing connecting the pulley Y'', which is driven by the belt Y, with the endless-worm cylinder.

The baling-wire T is supplied to the needle from a reel or roll, (not shown,) and the needle H is provided at its point with antifriction-wheels $h^2$ and $h^3$, around which the wire is drawn in the direction indicated by the arrows in Figs. 12, 15, 16, 17, 18, and 21.

The twister-hook is composed of a stem $q^2$, terminating in a cross-head composed of a counterweight-butt $q''$, projecting at one side of the stem, and a tapering point $q'$, projecting at the opposite side of the stem and extending beyond the end of the stem, so that when the wire loops are drawn by the point $q''$ and the hook is rotated the butt will not catch the loops, but will pass on the outside thereof, thus forming a twist in the loops each time the hook is rotated. The counterweight-butt $q''$ is preferably cylindrical, so that the curved face thereof will the more easily slide over the wires forming the loops. The axis of the point $q'$ is closer to the end of the stem at which the hook is located than is the axis of the cylindrical butt, and a guide-groove $q'''$ is provided in the hook beginning at the inner side of the base of the point and extending in an oblique line around the stem toward the outside of the butt, thus to assist in guiding the wire around the butt.

In practice before beginning to bale hay the endless worm will be put into operation, thus moving the plunger to and fro, the attendant, by pressing down on the rod O, will cause the needles to be thrown across the baling-chamber to carry the wire to the twister-clamp R, and the wire will then be fastened to the clamp, as will hereinafter be pointed out in describing the operation of baling, and when at the return of the plunger the needles have been withdrawn the rod O is allowed to rise again, and the needles will then remain stationary, withdrawn while the baling progresses and until the rod O is again pressed down and the rack I again causes their operation. When the wires have thus been strung across the baling-chamber on opposite sides of the plunger, which works back and forth in the chamber $a$, the machine is ready for operation.

In practical operation the cylinder is rotated at the desired speed and the traveler $d$ is driven by the worm, thus moving the plunger-beam and the plunger carried thereby to and fro. Hay is then placed in the feed-box G, and when the plunger completes a stroke away from the endless-worm cylinder the rack $f^2$ engages the pinion $f'''$, thus rotating the shaft $f''''$ and cog-wheel $f'$, thereby operating the rack $f$ to throw the condenser F into the feed-box G, thus to compress the hay into a small mass. The plunger B at this time has passed beyond the feed-opening. The continued rotation of the endless worm then retracts the plunger-beam and the plunger, and the first effect of this retraction is to rotate the pinion $f'''$, shaft $f''''$, and cog-wheel $f'$ in the opposite direction, thereby retracting the condenser from the charge of hay which it has condensed, and thus allowing the hay to be pushed down into the feed-chamber $a$ in front of the returning plunger. The plunger then completes its return stroke, driving this charge of hay before it and beyond the folder 13, which turns on its axis to allow the hay to enter the baling-chamber, but is prevented from returning by the ratchet 14. At the close of this stroke of the plunger the rack $f^3$ engages the pinion $f'''$ and throws the condenser in to press another charge of hay which has been fed into the feed-box G. Then the continued rotation of the endless-worm cylinder starts the plunger in the opposite direction, and the first movement thereof retracts the condenser from the condensed charge in the feed-box, thus allowing it to be pushed down in front of the plunger, which then forces the charge into the baling-chamber at the end of the feed-chamber, where it is held by the folder, as just described, and the operation is thus continued until sufficient charges of hay have been forced into the baling-chambers at the ends of the press to form bales of the desired size. Then the operator presses down on the rod O, thus throwing the clutch $m\,m'$ into engagement, so that the rotation of the cog-wheel J, which is caused by the rack I, rotates the cog-wheel L, and thus operates the rack K to throw the needles H across the baling-chamber to carry the wires T across behind the bale which has been formed. The needles carry their wires to their respective twisters and knotters, and each needle passes alongside of the other end of its wire, which is held by the clamp and the wire-support pertaining to the particular needle. As the needle passes the twister and knotter-hook Q it strikes upon the point $q$ thereof and tips the hook until its point passes the shoulder $h'$ and can be thrown up into the recess $h$. The point $q'$ of the hook thus comes in behind the wire ready to draw the wire away from the needle when the hook is forced from the needle. The point of the needle also engages the tilting clamp R, and the clamp tilts down to allow the point of the needle to pass, and as soon as the shoulder $h'$ has passed the clamp R the spring U returns the clamp to a sufficiently upright position to receive the wire between the clamp and snip jaw 5 and the post 3 and snip-jaw 4, which project from the main body of the clamp. The further forward movement of the needle causes the lever-operating shoulder $h''$ to engage the arm $x'$ of the lever X, thus moving the lever and causing the arm $x$ thereof to push the slide W away from the needle, thus carrying the twister-hook away from the needle and drawing the two ends of the bale-wire T into a loop from a right line drawn between the wire-support S and the wire-clamp R. The clutch $q$ of the twister-hook is connected by this movement of the hook, and at the same moment the rack $I^2$ rotates the pinion 7 and through the intermediate mechanism rotates the clutch $q$ and the twister-hook. This rotation of the twister-hook twists the two loops of the wire T into the knot $t$ and at the same time withdraws from the post 3 the end $t'$ of the wire which had been fastened around the post 3, but which had been released by the tilting of the clamp. When the knot is fully twisted, the hook will slip out of the loop. When the plunger returns, the ratchet 11 allows the pinion 7 to rotate without turning the twister backward. The return of the plunger causes the rack I to rotate the pinion J and the wheel L in the direction opposite to that in which they had just moved, thus throwing the rack K out and withdrawing the needle, thus removing the shoulder $h''$ from lever X to allow spring W to return the twister-hook to its initial position, and also bringing the shoulder $h'$ against the post 3 of the clamp K and forcibly drawing the clamp into a vertical position, and at the same time pushing it away from the needle and throwing the lever 6 into the position indicated in Figs. 10, 11, and 19. This causes the clamp and snip jaw 5 to snip the wire T and at the same time clamp it firmly against the post 3, and at the same time forces the post 3 outside of the needle, so that as the needle withdraws the wire T is drawn back on the opposite side of the post 3 from that on which it is clamped by the jaw 5, and when the needle has been fully withdrawn from the baling-chamber the wire remains drawn across the baling-chamber from the clamp to the withdrawn needle, ready to receive the next charge of hay when the same shall have been pushed down into the feed-chamber from the feed-box and then forced into the baling-chamber by the plunger. When this is done, it forces the bale along the baling-chamber and eventually out of the press.

21 indicates the usual catches for catching the hay which is pushed along by the plunger.

Now, having described my invention, what I claim as new, and desire to secure by Letters Patent, is—

1. The combination of a rotary endless-worm cylinder; a plunger having a path toward and from the cylinder parallel with or in line with the extended axis of the cylinder; a traveler driven by the worm; a connecting-beam connecting the plunger and the traveler; and guides for the plunger and traveler.

2. The combination of the press-frame having a chamber arranged lengthwise thereof; a plunger in the chamber; an endless-worm cylinder mounted lengthwise the press-frame at one end thereof; and a beam connecting the traveler and the plunger.

3. In a baling-press, the combination of a hay-condenser; a rack connected with the condenser to drive the same; a cog-wheel to drive the rack; a pinion connecting with the cog-wheel; and a rack connected with the plunger of the press and arranged to drive the pinion during a portion of the plunger-stroke.

4. In a baling-press, the combination of the hay-condenser; a rack connected with the condenser to drive the same; a cog-wheel to drive said rack; a pinion connected with the cog-wheel; two racks connected with the plunger of the press and arranged facing in opposite directions with a space between them, to respectively engage the pinion at opposite sides thereof at the extremes of the stroke of the plunger.

5. The combination of a baling-press frame; a plunger working in the chamber thereof; a needle mounted at one side of the chamber and arranged to play across the chamber; a rack connected with the plunger to move therewith; a cog-wheel arranged to be rotated by such rack; a rack connected with said needle to operate the same; a cog-wheel to operate the rack; and means to connect the two cog-wheels with each other.

6. The combination of the baling-press frame; the plunger arranged to work in the chamber thereof; a rack connected with such plunger; a cog-wheel meshing with said rack; needles arranged to move across the baling-chamber; a rack connected with such needles; a cog-wheel meshing with such rack; a clutch to connect the two cog-wheels; and means for throwing the clutch into and out of gear.

7. The combination of the baling-press frame; a plunger in the chamber thereof; mechanism on one side of the chamber for gripping and knotting baling-wires; means operatively connected with the plunger for operating said mechanism; needles for the baling-wires mounted at the opposite ends of the chamber and having a path across the chamber; a rack at right angles to the plunger and connected with the needles at one end of the chamber; a cog-wheel meshing with such rack; a pinion for driving such cog-wheel; a rack at right angles with the plunger and connected with the needles at the other end of the chamber; a cog-wheel meshing with such rack; a pinion for driving such cog-wheel; and a rack on the plunger for operating the pinions.

8. The combination of the rotary twister-hook mounted to rotate and to move axially; a clamp arranged at one side of the path of the twister-hook for holding one end of a wire; a wire-support on the opposite side of the twister-hook; means for moving the twister-hook axially to draw the wire into a loop from between the wire-clamp and the wire-support; and means for rotating the twister-hook.

9. The combination of a rotary twister-hook mounted to move axially; a wire-clamp and a wire-support arranged on opposite sides of the path of the hook; the hook being normally free to turn and located on one side of a right line drawn between the wire-clamp and the wire-support; a needle arranged to carry a wire past the support and into the clamp; means to move the hook from the needle to draw the wire into a loop; and means for rotating the hook.

10. The combination of the wire-support; the twister-hook normally free to turn and mounted to move axially, and being normally on one side of a right line drawn between the support and a wire-clamp; such clamp pivoted to tilt; a needle arranged to tilt the clamp and to carry a wire past the wire-support and into the clamp; means to return the clamp to an upright position to receive the wire; means for operating the clamp to clamp the wire; means for moving the twister-hook axially to draw the wire into a loop from between the wire clamp and support; and means for rotating the hook.

11. The combination of a slide; a wire-clamp pivotally mounted on the slide to tilt in one direction; a needle arranged to tilt the wire-clamp and provided with means for carrying a wire over such clamp and also provided with a recess to allow the clamp to return to an upright position; a spring provided to throw the clamp toward an upright position; a shoulder being provided on the needle to engage the clamp to force it to the upright position at the return movement of the needle, and beveled to slide the clamp out of the way.

12. The combination of a clamp-jaw pivoted to a base to tilt thereon; a guideway arranged oblique the axis of such jaw; a jaw pivoted to the tilting jaw; and an arm fixed to such pivoted jaw and extending into the oblique guideway, so that when the clamp formed of the two jaws is tilted, the arm will operate the pivoted jaw.

13. The clamp comprising a main body pivoted to tilt and provided with a wire-holding post and a wire-snip jaw with a space between them; a clamp and snip jaw pivoted to such body and arranged to move toward and from the space between the post and snip-jaw, and provided with a cutting edge to snip the wire and with a clamping-face to clamp a wire on the wire-holding jaw, and means for operating the clamp and snip jaw.

14. The combination of the wire-support; the tilting wire-clamp; the twister-hook arranged to normally stand between the wire-support and the tilting clamp at one side of a right line drawn between the support and clamp and arranged to move axially and having a path transverse to the line drawn between the wire-support and tilting clamp; a needle for carrying a wire past the support and over the jaws of the clamp and provided with a recess to allow the clamp to return to an upright position; means for returning the clamp toward an upright position, a shoulder being provided on the needle to engage the clamp at the return of the needle to move the clamp and the slide sidewise out of the path of the needle.

15. The combination of the rotary twister-hook; a slide carrying such hook; a needle; and a lever having one arm arranged to move the slide, and the other arm arranged in the path of the needle; and means for returning the slide to its normal position.

16. The combination of the press-frame; a plunger-carrying beam; a wire-carrying needle mounted on one side of the chamber of the frame and arranged to move across such chamber; a wire-support and a tilting wire-clamp arranged on the opposite side of the chamber; a twister-hook arranged to normally stand between the wire support and clamp; a slide carrying such hook; means arranged to be operated by the needle to move such slide away from the path of the needle; means operatively connected with the plunger to rotate the twister when thrown to one side; and means to return the twister-slide to normal position.

17. The combination of the rotary twister-hook; the plunger of the press; a rack to move with said plunger; a cog-wheel to mesh with said rack; means for holding a wire in the path of the hook; means for throwing the hook to draw the wire into a loop; and a clutch for operatively connecting the twister-hook with the said cog-wheel to rotate the hook.

18. The combination of the rack connected with the plunger to move therewith; a cog-wheel meshing with said rack; the twister-hook for twisting the wire of the bale; means for rotating the twister-hook; and a ratchet connection connecting the said means with said cog-wheel.

19. The combination of the wire-holder; the wire-clamp; the twister-hook journaled on a slide arranged to play in a path between the wire-holder and the clamp; a needle for carrying the wire into the clamp; and a lever, one of the arms of which is in the path of the needle to be operated thereby and the other arm of which engages the slide to operate the same.

20. The pinion provided with the flat face and the two oppositely-facing racks and the guide moving together to rotate the pinion in opposite directions at opposite ends of the stroke and to hold the pinion stationary at the middle of the stroke.

21. The combination of the plunger-beam; two racks arranged at a distance apart on the plunger-beam and facing in opposite directions on opposite sides of a path for a pinion; a pinion arranged in said pinion-path to be alternately engaged on its opposite sides by the said racks respectively as the plunger-beam moves to and fro, said pinion being provided with a flat face at one end to be engaged by a guide for the purpose of holding the pinion stationary; and such guide arranged extending between the racks to engage the said flat face to hold the pinion in position to engage the racks.

22. The combination of the plunger-beam; two racks arranged at a distance apart on the plunger-beam and facing in opposite directions on opposite sides of a path for a pinion; a pinion arranged in said pinion-path to be alternatively engaged on its opposite sides by the said racks respectively as the plunger-beam moves to and fro, said pinion being provided with a flat face at one end to be engaged by a guide for the purpose of holding the pinion stationary; such guide arranged extending between the racks; the condenser provided with a rack to operate the same; a cog-wheel meshing with the condenser-rack; and a shaft connecting the cog-wheel with the pinion.

23. The combined wire clamp and snip comprising a body member provided with a post and a snip-jaw; and a clamp and snip jaw pivoted to the body member and arranged to enter the space between the post and snip-jaw.

24. The combination of the body member of the clamp provided with the post and the snip-jaw; the clamp and snip jaw pivoted to the body member and arranged to enter the space between the post and the snip-jaw; and means for operating the clamp and snip jaw.

25. The combination of the endless-worm cylinder; the plunger-beam provided with a traveler arranged to be engaged by the endless worm; the plunger on such beam; the knotter arranged on one side of the baling-frame; a needle arranged on the other side of the baling-frame; means connecting the plunger with the needle to operate the needle to and fro across the baling-chamber; and means connecting the plunger with the knotter mechanism to operate the same.

26. The twister-hook composed of a stem terminating in a cross-head composed of a counterweight-butt projecting at one side of the stem and a tapering point projecting at the opposite side of the stem, and extending beyond the end of the stem.

27. The twister-hook composed of a stem terminating in a cross-head composed of a cylindrical counterweight-butt projecting at one side of the stem and a tapering point projecting at the opposite side of the stem and extending beyond the end of the stem and the axis of which point is closer to the end of the stem than the axis of the cylindrical butt; a guide-groove being provided beginning at the inner side of the base of the point and extending in an oblique line around the stem toward the outer side of the butt.

ELMER J. SHIRLEY.

Witnesses:
 JAMES R. TOWNSEND,
 ALFRED I. TOWNSEND.